FREQUENCY TO VOLTAGE CONVERTER

Filed Dec. 3, 1958

GEORGE S. BAHRS
DALTON W. MARTIN
MALCOLM M. McWHORTER
*INVENTORS*

BY
Flehr and Swain
ATTORNEYS 3,205,448
Patented Sept. 7, 1965

3,205,448

FREQUENCY TO VOLTAGE CONVERTER

George S. Bahrs, Menlo Park, Dalton W. Martin, Palo Alto, and Malcolm M. McWhorter, Menlo Park, Calif., assignors to Vidar Corporation, Mountain View, Calif., a corporation of California Filed Dec. 3, 1958, Ser. No. 778,015
5 Claims. (Cl. 329—126)

This invention relates generally to a frequency to voltage converter.

In many applications, it is desirable to provide an output voltage which is proportional to the frequency of an input signal. For example, in instrumentation the voltage output of a transducer may be converted to a signal having a frequency which is controlled thereby. This signal frequency may then be recorded on magnetic tape. Upon reproduction, it may be desirable to reconvert the signal to a voltage whose amplitude is proportional to the frequency.

Devices for forming an output voltage which is proportional to the frequency of an input signal include a capacitor which is charged and discharged a predetermined amount for each cycle of the input signal. An average of either the charging or discharging current flowing into the capacitor is taken and gives an indication of the frequency. Generally, diodes are employed to clamp the capacitor so that it operates between fixed predetermined voltage limits so that it charges and discharges a constant amount during each cycle of the input signal. Devices of the prior art usually employ a multivibrator, which is synchronized by the input signal, to form a squarewave which controls the charging and discharging of the capacitor. Circuits of the prior art have shortcomings. For example, some are temperature sensitive; others do not respond linearally; and others are both non-linear and temperature sensitive.

It is a general object of the present invention to provide an improved frequency to voltage converter.

It is another object of the present invention to provide a frequency to voltage converter which includes an improved charging-discharging circuit.

It is another object of the present invention to provide a frequency to voltage converter which is relatively linear.

It is another object of the present invention to provide a frequency to voltage converter which includes clamp diodes for clamping the voltage excursions of the capacitor and switching diodes for separately routing the charging and discharging currents, both sets of diodes being matched to reduce the temperature sensitivity.

It is still another object of the present invention to provide a frequency to voltage converter which includes clamp diodes for controlling the voltage excursions of the capacitor and switching diodes for routing the capacitor currents, and a circuit connected to the switching diodes which serves to change the voltage on the same in such a manner as to linearize the operation of the circuit to permit linear operation for relatively large output voltage swings.

These and other objects of the invention will become more clearly apparent from the following description when taken in conjunction with the accompanying drawings.

Referring to the drawing.

Figures 1, 2, 3:
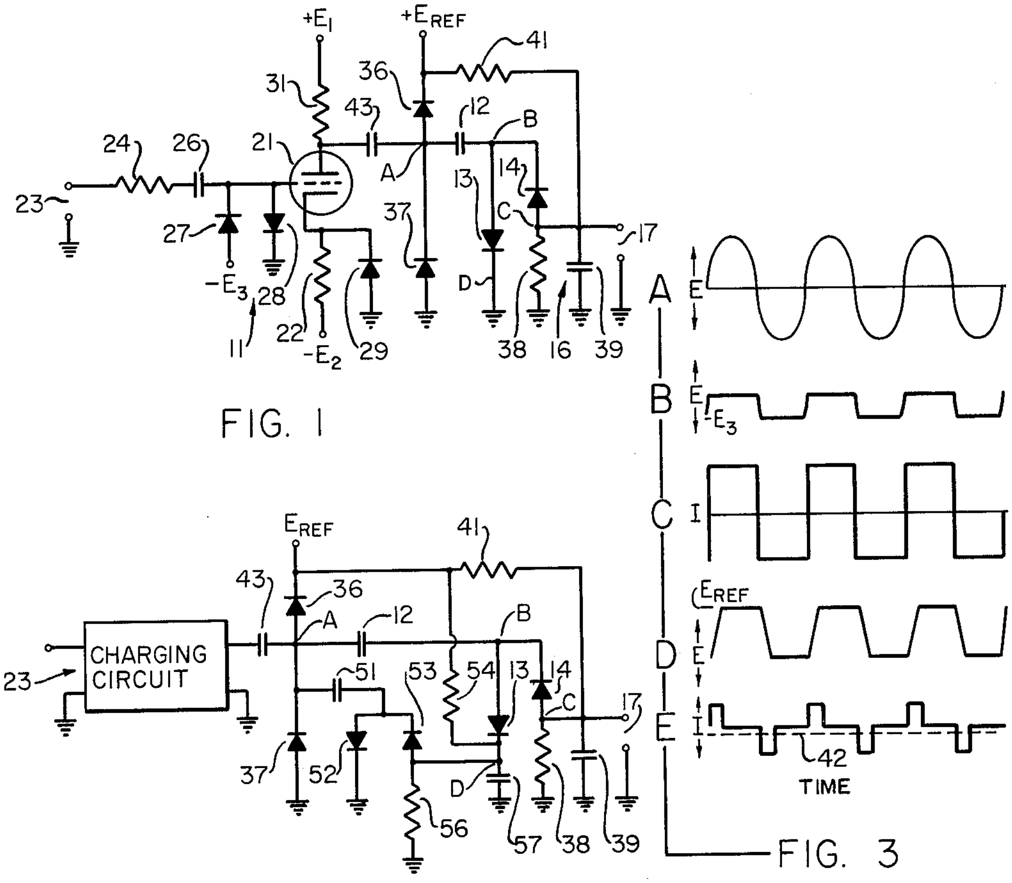
FIGURE 1 is a detailed circuit diagram of one embodiment of the invention.
FIGURE 2 is a circuit diagram of another embodiment of the invention.
Figure 4:
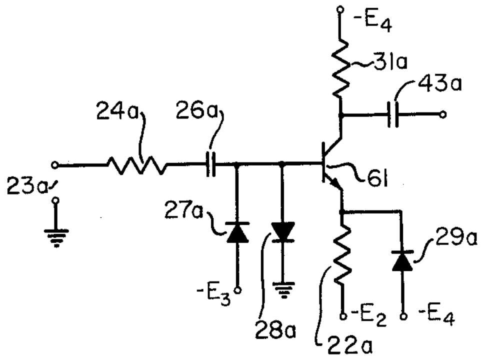

FIGURES 3A–E show the current and voltage waveforms at various points in the circuits of FIGURES 1 and 2; and FIGURE 4 is a circuit diagram of a suitable transistorized charging circuit.

Generally, the circuit of the present invention includes a charging circuit 11 which develops an alternating current having a frequency related to that of the input signal. The circuit illustrated develops a squarewave of current at the frequency of the incoming signal. This squarewave of current is applied to one terminal, node A, of a precision capacitor 12. Node A is also connected to a pair of serially connected clamping diodes 36 and 37 which have a reference voltage +E applied thereto. The other terminals 17 which is proportional to the D.-C. average pair of switching diodes 13 and 14 which serve to route the charging current to ground and the discharging current to node C. A circuit 16 is associated with one of the diodes 13 or 14 and develops an output signal at the terminals 17 which is proportional to the D.-C. average of the current pulses flowing through the associated diode.

The voltage $E_{out}$ appearing at the terminals 17 will be dependent upon the frequency $f$ at which the capacitor 12 is charged and discharged, the value of the capacitor C12, and the voltage between which the capacitor swings E. Thus, the output voltage can be expressed as $$E_{out}=K\cdot f\cdot C12\cdot E\cdot$$

where K is a proportionality factor.

The charging circuit 11 includes an amplifying means such as a tube 21 and associated components. A charging circuit including a transistor will be presently described. The circuit is such that the magnitude of the current squarewave is determined primarily by the voltage $-E_2$ and the resistor 22, and is relatively independent of properties of the tube 21 and of the magnitude of the incoming signal (as long as the signal exceeds some minimum level).

The incoming signal $E_{in}$ is supplied to the terminals 23. Resistor 24 and capacitor 26 couple the input signal to the gride of the tube 21. A pair of oppositely poled diodes 27 and 28 serve to clip the input signal whereby its voltage excursion is between $-E_3$ and ground.

When to voltage on the grid of the tube 21 is at ground, zero volts, the tube conducts and the cathode positive by a few volts. The diode 29 is reverse biased. Grid current is negligible. The cathode and plate currents are virtually equal. If the voltage $-E_2$ is much greater than the voltage on the cathode, $e_k$, then the tube current is very nearly equal to the value $-E_2/R_{22}$.

When the grid goes negative and is clamped to the value $-E_3$, the cathode current drops so that the cathode voltage decreases until the diode 29 conducts and holds the cathode at ground potential. Since the grid is at cut-off, the tube is cut-off. The presence of the diode 29 reduces the magnitude of the required driving signal. If the diode 29 were not present, the grid of the tube 21 would have to be driven negative by an amount in excess of $-E_2$ to drive the tube to cut-off.

If the voltage $+E_1$ is chosen to be considerably greater than the maximum voltage appearing at the plate, the current through the resistor 31 will be approximately constant. The current applied to the node A will then alternate (at the input frequency) between the current through the resistor 31 and the current represented by the difference between the current through the resistor 31 and the current through the resistor 22. The current through $R_{22}$ is $E_2/R_{22}$.

An input signal $E_{in}$ is schematically illustrated in FIGURE 3A. In FIGURE 3B, the clamped signal applied to the grid of the tube 21 is illustrated. In FIGURE 3C, the current waveform applied to the node A is illustrated.

During a portion of each half cycle, the current from the charging circuit flows into the capacitor 12. After sufficient charge has flowed into the capacitor 12 so that the voltage at the node A rises to the voltage $E_{ref}$, the diode 36 begins to conduct, diverting the current from the charging circuit so that the voltage at the node A rises only very slightly above $E_{ref}$. The rise above $E_{ref}$ is due to the forward drop of the diode 36. During the discharge portion of the cycle, the voltage at the node A is lowered to a potential slightly below zero. The slight difference is due to the forward drop for the diode 37.

If the voltage at the terminals 17 and the drops in the diodes 13 and 14 are quite small compared with the reference voltage, then the capacitor 12 is subjected to a voltage change which is very nearly equal to $E_{ref}$ each cycle. The charging current will flow through the diode 13 and the discharging current through the diode 14. The average current through either of the diodes will, therefore, be indicative of the frequency of the input signal. The output voltage $E_{out}$ due to this current can be represented by the following expressions:

$$E_{out}=\frac{E_{ref}R38}{R38+R41}(1-R41\cdot C12\cdot f)$$

The capacitor 39 is made large enough to effectively average the current pulses flowing through the diode 14.

If it is desired that the output voltage at the terminal 17 be zero for some frequency $f_0$, and then go plus or minus as the frequency departs from the value $f_0$, the resistor 41 is chosen so that it furnishes a current to the node C that just balances the average current diode 14 when $f=f_0$.

Referring particularly to FIGURE 3D, the voltage on the capacitor 12 (as seen at node A) is illustrated. Thus, it is seen that the voltage rises from zero to the reference voltage during a portion of each half cycle and likewise decays to zero during a portion of each half cycle.

It is apparent that the current flows only during the period of time during which the capacitor is charging or discharging. Referring to FIGURE 3E, the capacitor current waveform is shown. Thus, current pulses of opposite polarity flow through the diodes 13 and 14 as indicated. The dotted line 42 shows the average D.-C. current of the negative current pulses.

As previously described, the voltage excursion to which the capacitor 12 is subjected during each cycle departs slightly from $E_{ref}$. An expression for the departure follows:

(Voltage drop in diode 36) + (voltage drop in diode 37) — (voltage drop in diode 13) — (voltage drop in diode 14) — (output voltage $E_{out}$).

As is well known, the diode drops are sensitive to changes in current and temperature. $E_{out}$ increases with the frequency of the input signal. Thus, the voltage excursions of the capacitor are dependent upon the input frequency. The response is not truly linear. However, the non-linearity introduced by the output voltage may be kept small by choosing the resistor 41 so that $E_{out}$ is always very small compared with the reference voltage. A circuit will be presently described which provides for moderately large values of $E_{out}$ while maintaining excellent linearity.

As temperature increases, the voltage drops in the diodes 36 and 37 decrease, thus tending to decrease the voltage change to which capacitor 12 is subjected. However, at the same time the drops in the diodes 13 and 14 decrease tending to increase the voltage excursions experienced by the capacitor 12. This can be more clearly seen from the expression written above. The net result is that the changes in the voltage drops of the diodes 13 and 14 tend very nearly to offset the changes in voltage drops of the diodes 36 and 37. By suitably matching the diodes, the effect of temperature changes may be reduced substantially.

A circuit was constructed in accordance with FIGURE 1 in which the various components and voltages had the following values.

Voltages:
- $+E_1=300$ volts
- $-E_3=-18$ volts
- $-E_2=-300$ volts
- $E_{ref}=105$ volts Tube:
- 21—12AU7 (Both sections in parallel)

Resistors:
- 22—30K ohms
- 24—18K ohms
- 31—20K ohms
- 38—440 ohms
- 41—400K ohms Capacitors:
- 12—50 mmf.
- 26—0.01 mf.
- 39—0.10 mf.
- 43—0.10 mf.

Diodes:
- 13—Hewlett-Packard Microjunction
- 14—Hewlett-Packard Microjunction
- 27—Texas Instruments 604
- 28—Texas Instruments 604
- 29—WE 01607
- 36—HD 6007
- 37—HD 6007

A circuit constructed in accordance with the foregoing was operated with input signal frequencies varying between 50 and 100 kc. The output voltage was linearly proportional to the frequency within 0.035 percent over the 2:1 frequency range. The drift of the converter when subected to temperature changes of 90° F. was less than 0.1 percent. The longtime drift was less than 0.1 percent and the short term drift was less than .02 percent.

As discussed above, the output voltage subtracts from the voltage excursions to which the capacitor is subjected. When the output voltage $E_{out}$ is made an appreciable fraction of the reference voltage, the non-linearity is increased. Referring to FIGURE 2, an embodiment of the invention that provides moderate output voltages with excellent linearity is shown.

Consider the basic arrangement previously described, that is, with node D grounded, as the frequency is increased, the output voltage increases and the combination of the diodes 13 and 14 becomes back biased by the amount of the output voltage. The node B must swing $E_{out}$ volts each half cycle before the proper diode starts to conduct. This effect is analogous to backlash in a gear system. It causes the voltage change to which capacitor 12 is subjected to be reduced as the frequency increases. Thus, at high frequencies a given frequency increment causes less change in output voltage than the same incremental change would cause at a lower frequency. The output voltage versus frequency relationship is, therefore, non-linear over the range of frequencies.

The circuit described above is linear because $E_{out}$ is only a small fraction of $E_{ref}$. If larger output, say one volt, is desired, the non-linearity may become significant.

In FIGURE 2 there is illustrated a circuit having linearizing elements which include the capacitor 51, diodes 52 and 53, and resistors 54 and 56. These elements are arranged so that the voltage at the node D is equal approximately to the output voltage. This voltage is applied to one terminal of the diode 13 and causes the voltage difference to which the capacitor is subjected to be very nearly constant irrespective of input frequency.

It is observed that the remainder of the circuit just described is similar to the circuit previously described and, therefore, carries like reference numerals.

A circuit was constructed in accordance with FIGURE 2 in which the additional elements had the following values:

Diodes:
- 52—WE 01607
- 53—WE 01607

Capacitors:
- 51—100 mmf.
- 57—0.10 mf.

Resistors:
- 54—400K ohms
- 56—4400 ohms
- 38—4400 ohms

A converter in accordance with the foregoing was operated. The output at maximum input frequency was 1.0 volts. The measured linearity was better than 0.02 percent over a 2:1 frequency range.

Referring to FIGURE 4, a transistorized charging circuit is illustrated. The circuit elements carry the same numbers as corresponding elements in FIGURE 1 with the addition of the identification "*a*". The transistor 61 is connected in a common emitter configuration. The input signal is coupled to the base of the transistor 61 by resistor **24*a* and capacitor 26*a*. The diodes 27*a* and 28*a*** serve to clip the signal whereby its voltage excursion is between $-E_3$ and ground.

When the voltage on the base is at ground, the transistor conducts and the emitter goes positive and the base current will be a very small fraction of the emitter current for a good transistor. The diode **29*a* is reverse biased. The emitter and collector currents are virtually equal. The collector current is $-E_2/R_{22a}$. When the base goes negative, the emitter voltage decreases until diode 29*a*** conducts and holds the emitter at $-E_4$. The transistor is then cut off. In all other respects, operation of the circuit is substantially as described with reference to the vacuum tube embodiment.

In many applications, for example, in digital voltmeters and digital to analogue converters, it is desirable to be able to derive a fixed charge for each cycle of input information or for each input pulse. The circuits described may be employed for this purpose. A fixed charge for each input cycle or pulse is available at each of said switching paths. Thus, by omitting the capacitor 39 and resistor 38, a fixed charge is available at the output terminals.

Thus, it is seen that an improved frequency to voltage converter is provided. The converter provides an output voltage which is proportional to an input frequency and which varies linearally with changes in frequency. The converter is relatively immune to changes in temperature.

We claim:

1. A frequency to voltage converter comprising input means forming an alternating current having a frequency related to that of an input signal, a pair of serially connected diodes, means for applying a reference voltage to said diodes, means for applying said current to the common terminal of said diodes, a capacitor having one terminal connected to said common terminal, first and second current paths each including a diode connected to the other terminal of said capacitor, said diodes being arranged to conduct current of opposite polarity from said terminal, means connected in one of said current paths for deriving an output signal voltage proportional to the average current flowing in the same, means connected to the other of said current paths and serving to apply a voltage thereto which is proportional to and substantially in phase with the output voltage.

2. A frequency to voltage converter comprising means for swinging a terminal between fixed voltage limits at a rate proportional to the frequency of an input signal, a capacitor having one terminal connected to said terminal, first and second current paths each including a diode connected to the other terminal of said capacitor, said diodes being arranged to conduct current of opposite polarity from said terminal, means connected in one of said current paths for deriving an output signal voltage proportional to the current flowing in the same, means connected to the other of said current paths and serving to apply a voltage thereto which is proportional to and substantially in phase with the output voltage.

3. A circuit of the character described comprising means forming a current having a frequency related to that of an input signal, a pair of serially connected diodes, means for applying a reference voltage to said diodes, means for applying said current to the common terminal of said diodes, a capacitor having one terminal connected to said common terminal, first and second current paths each including a diode connected to the other terminal of said capacitor, said diodes being arranged to conduct current of opposite polarity from said terminal, output means connected to one of said paths, and voltage means connected to the other of said current paths and serving to apply a voltage thereto which is proportional to and substantially in phase with the output voltage.

4. A frequency to voltage converter as in claim 2 in which said last named means comprises a second capacitor and a pair of uni-directional conducting elements.

5. A frequency to voltage converter as in claim 2 in which said last named means comprises a capacitor having one terminal connected to said one terminal and its other terminal of the capacitor connected to a pair of uni-directional conducting elements arranged to conduct currents of opposite polarity to the other terminal, means connected in circuit with one of said uni-directional conducting elements to derive a voltage proportional to the current flowing through said uni-directional conducting elements, and means for applying said voltage to the diode in the other of said current paths.

References Cited by the Examiner

UNITED STATES PATENTS

| | | | |
|---|---|---|---|
| 2,403,557 | 7/46 | Sanders | 324—78 |
| 2,560,378 | 7/51 | White | 329—126 |
| 2,703,382 | 3/55 | Cleary. | |
| 2,750,500 | 6/56 | Aiken. | |
| 2,828,417 | 4/58 | Fleming et al. | |
| 2,851,599 | 9/58 | Henry. | |

ROY LAKE, *Primary Examiner.*

SAMUEL B. PRITCHARD, L. MILLER ANDRUS, BENNETT G. MILLER, *Examiners.*